W. M. STILES.
PEA PICKER.
APPLICATION FILED APR. 9, 1918.
1,282,973.
Patented Oct. 29, 1918.
4 SHEETS—SHEET 4.
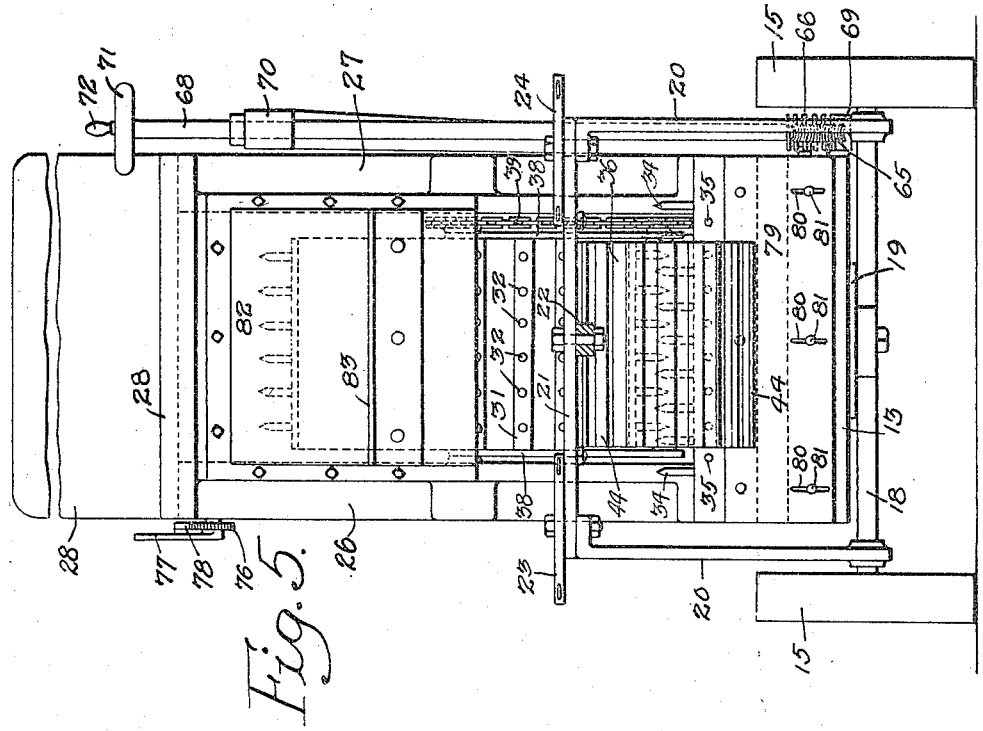
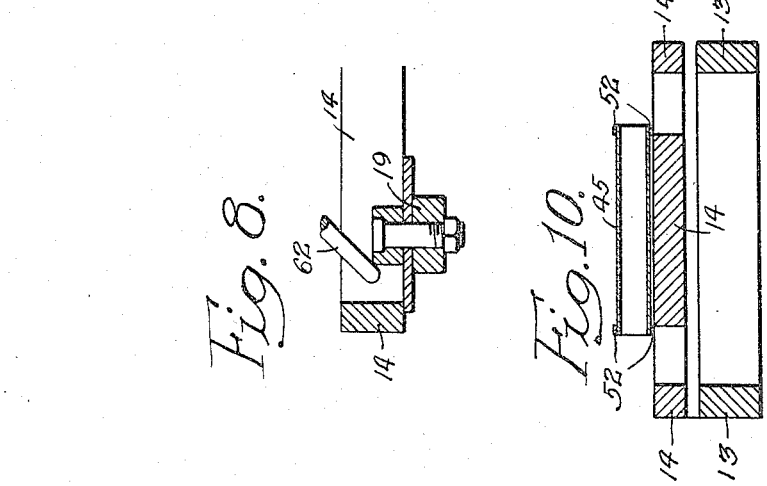
Witnesses,
E. E. Reichart
Augustus B. Coppes
Inventor,
Wayne M. Stiles
By Joshua R. H. Potts
His Attorney

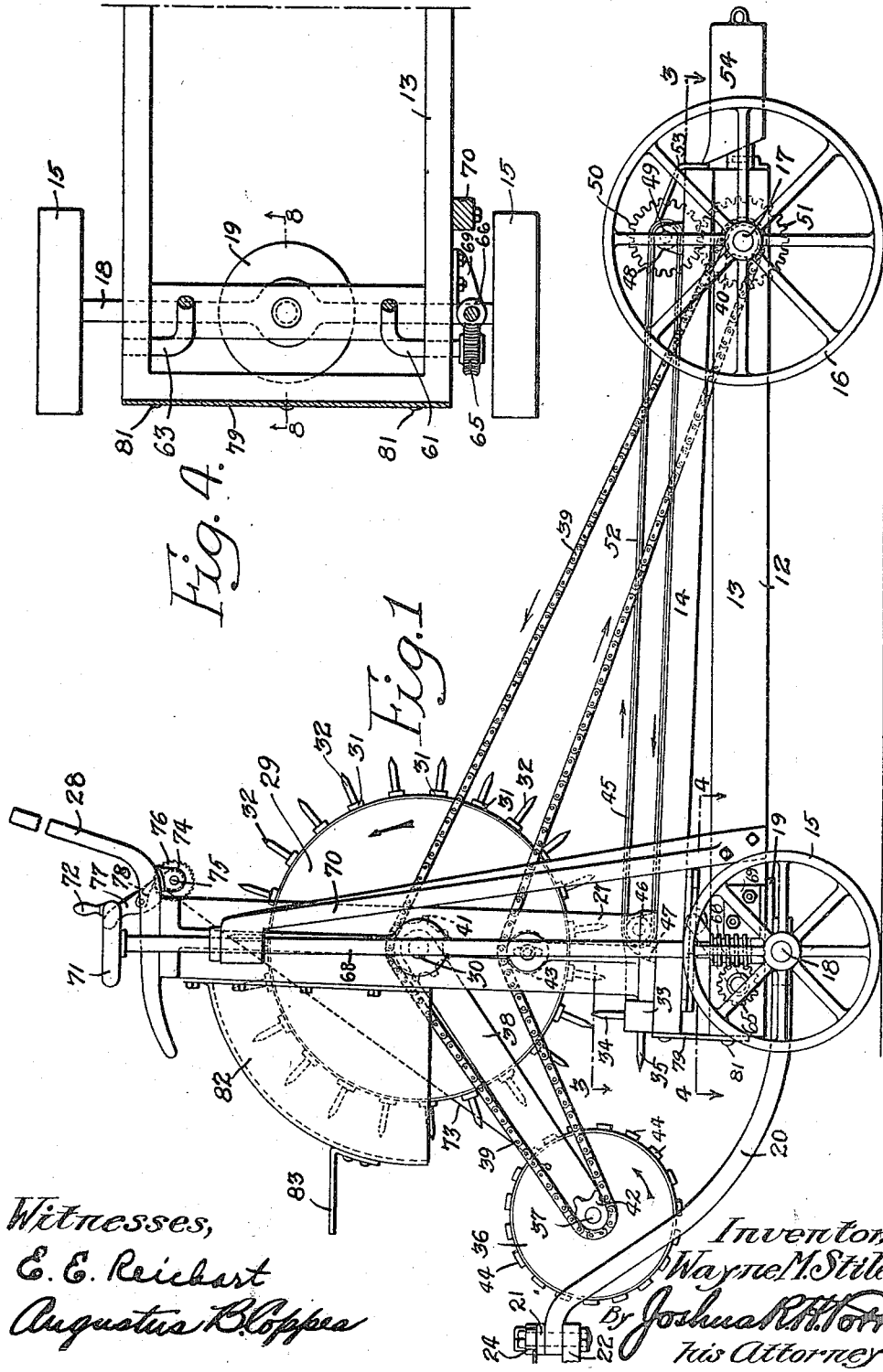

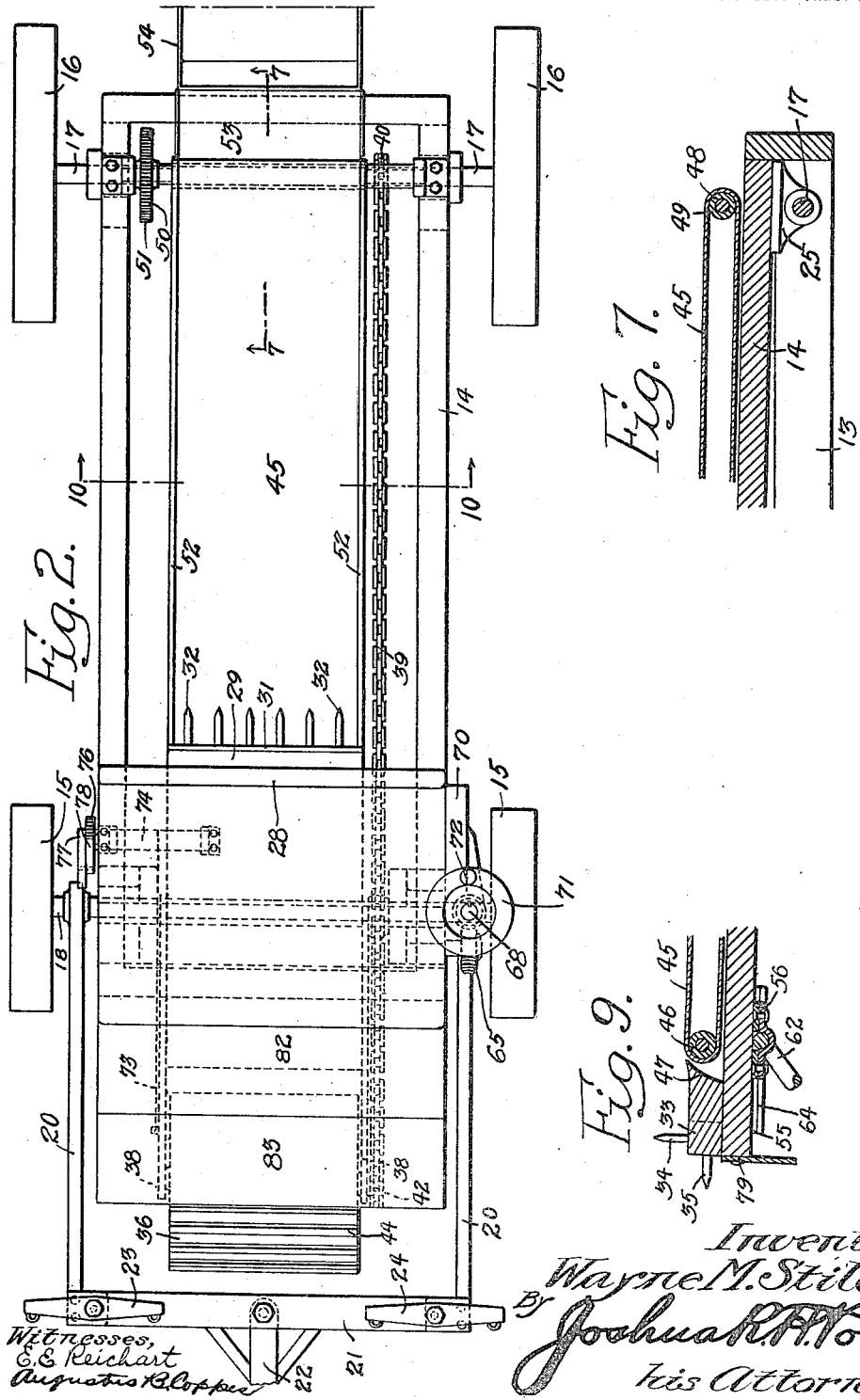

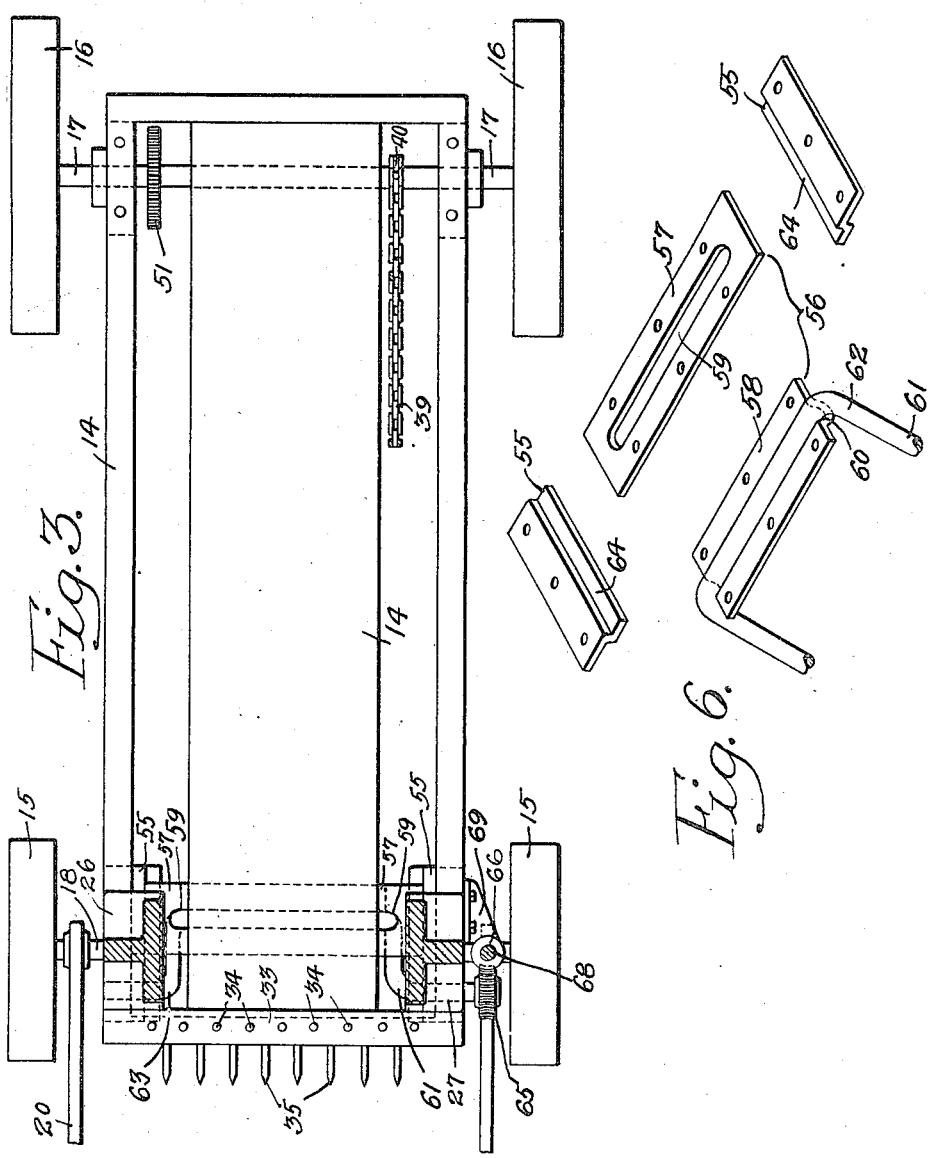
W. M. STILES.
PEA PICKER.
APPLICATION FILED APR. 9, 1918.
1,282,973.
Patented Oct. 29, 1918.
4 SHEETS—SHEET 3.

UNITED STATES PATENT OFFICE.

WAYNE M. STILES, OF MOUNT HOLLY, NEW JERSEY.

PEA-PICKER.

1,282,973.   Specification of Letters Patent.   Patented Oct. 29, 1918.

Application filed April 9, 1918. Serial No. 227,437.

*To all whom it may concern:*

Be it known that I, WAYNE M. STILES, a citizen of the United States, residing at Mount Holly, in the county of Burlington and State of New Jersey, have invented certain new and useful Improvements in Pea-Pickers, of which the following is a specification.

One object of my invention is to provide apparatus in the form of a machine which will quickly and thoroughly remove or pick peas from vines while the latter are growing.

Another object is to so construct my invention that it will remove peas or other vegetables from their plants without materially injuring the plants or prevent their growth.

Another object is to so construct my invention that it can be pulled by horses through a field or garden to pick the vegetables in the manner above described.

A further object is to so make the apparatus of my invention that it will be strong and durable and can be regulated to suit various requirements so as to pick the vegetables from plants of different height.

These objects, and other advantageous ends which will be described hereinafter, I attain in the following manner, reference being had to the accompanying drawings in which—

Figure 1 is a side elevation of the apparatus of my invention,

Fig. 2 is a top plan view of Fig. 1,

Fig. 3 is a sectional plan view taken on the line 3—3 of Fig. 1,

Fig. 4 is a fragmentary sectional plan view taken on the line 4—4 of Fig. 1,

Fig. 5 is a front elevation of my invention,

Fig. 6 is a detached perspective view of certain of the elements of my invention, Fig. 7 is a fragmentary section taken on the line 7—7 of Fig. 2, Fig. 8 is a section taken on the line 8—8 of Fig. 4, Fig. 9 is a fragmentary central sectional elevation taken through certain of the elements of my invention, and Fig. 10 is a section on the line 10—10 of Fig. 2.

Referring to the drawings, 12 represents a vehicle body including a main frame 13 and a top or table 14. The vehicle body 12 is supported on wheels 15 and 16 positioned respectively adjacent the front and back thereof. The wheels 16 are secured on an axle 17 which is rotatably mounted within the frame 13. The wheels 15 are mounted on an axle 18 which is pivotally connected to the bottom of the frame 13 by a fifth wheel connection 19. A yoke 20 is connected to the front axle 18 and supports a main whiffletree 21 and a center pole 22. As illustrated, the apparatus is adapted to be pulled by two horses and I have, therefore, shown two whiffletrees 23 and 24 which are pivotally mounted to the main whiffletree 21.

The under surface of the rear end portion of the table 14 has a bracket 25 secured thereto and the rear axle 17 is adapted to rotate within the bracket. Thus the table 14 is pivoted on the rear axle 17 and can be raised and lowered in various pivotal positions, as will hereinafter be more thoroughly described. The table 14 adjacent its front end has two standards 26 and 27 secured thereto and these standards are spaced apart, as clearly shown in Figs. 3 and 5. The standards 26 and 27, at their top, provide a support for a driver's seat 28.

A drum 29 is adapted to rotate between the standards 26 and 27 and has a shaft 30, the ends of which are respectively journaled in the standards 26 and 27. The drum 29 has a number of bars 31 secured thereto and arranged around its peripheral surface. Each of these bars 31 forms a support for a row of pins 32 which are spaced apart, as clearly shown in Figs. 2 and 5.

The table 14 has a member 33 in which is mounted two rows 34 and 35 of pins, the pins 34 being substantially upright while the pins 35 project forwardly. In other words, the pins 34 are substantially vertical while the pins 35 are substantially horizontal. The pins 35 project beyond the forward end of the table 14 and are adapted to penetrate between the branches of the plants when the apparatus is moved forwardly.

A batting drum 36 is mounted on a shaft 37 which is journaled in arms 38, the latter being pivoted on the shaft 30. This batting drum 36 and the drum 29 are adapted to be rotated, in the direction of the arrows shown in Fig. 1, by a chain 39 which is driven from a sprocket 40 on the rear axle 17. This chain passes over a sprocket 41 on the shaft 30 and a sprocket 42 on the shaft 37.

An idler roller 43 is also provided to take up the slack in the chain 39 and this idler roller 43 is adjustably mounted on the standard 27. The batting drum 36 has a series of ribs or strips 44 on its circumferential surface and these strips are for the purpose of batting down the top portions of the plants and for directing them between the pins 35 during the forward movement of the apparatus.

The combined action of the pins 32 during the rotation of the drum 29 and the pins 34 is to comb the branches of the plants of their fruit; for example, when the apparatus is to be used for picking peas the pea-vines engaging the pins 35, as above noted, will be combed by the pins 32 and pins 34 and the pea pods will be stripped from the vines.

An endless apron conveyer 45 is mounted on the table 14 and, at its forward end, passes around a roller 46. This roller 46 is located adjacent the rear end of the member 33, said rear end of this member is preferably undercut, as shown at 47, so that the peas as they are stripped will move along on the top of the member 33 and directly onto the top run of the conveyer 45. The rear end of this conveyer passes around a roller 48 which is secured to a shaft 49. This shaft 49 has a gear wheel 50 secured thereto, the gear wheel 50 being in mesh with the gear wheel 51 fixed to the rear axle 17, as clearly shown in Figs. 1 and 3.

The apron conveyer is preferably made of canvas or other flexible material and includes strips 52 adjacent opposite edges to prevent the fruit from falling off the sides of the apron. A plate 53 is secured at the rear end of the table 14 and the forward end of this plate is positioned closely adjacent the rear end of the apron. This plate, at its top, is inclined and is adapted to receive the fruit from the rear end of the conveyer and deflect it into a receptacle 54 which is detachably connected to the rear of the frame 13.

In order to raise and lower the forward end of the table 14 to suit different requirements, such for example as plants of various heights, I provide the bottom of the table 14 with rails 55 (see Figs. 1, 3, and 6). These rails are spaced apart and adapted to support a slidable carriage 56. This carriage 56, as illustrated, includes two plates 57 and 58. The plate 57 has a slot 59 which, when the plates are assembled, is directly over an elongated recess 60 in the plate 58.

A crank shaft 61 has its crank 62 fitting within the recess 60 and its opposite end portions 63 rockably mounted within the frame 13. The plate 57 is longer than the plate 58 and the projecting ends of the plate 57 are adapted to ride between the ledge portions 64 of the rails 55 and the bottom of the table 14. One of the end portions 63 of the crank shaft 61 has a worm wheel 65 secured thereto and this worm wheel is in mesh with a worm 66. This worm 66 is secured to the bottom of an upright rod 68. The lower end of this rod 68 is mounted in a step or bottom bearing 69. The upper end of this rod is journaled in a bracket 70 which, in the present instance, projects upwardly from and is secured to the frame 13. The top of the rod 68 has a hand wheel 71 thereon and a handle 72 is secured to the hand wheel 71.

The handle 72 is located adjacent the driver's seat 28 so that the driver by rotating the wheel 71 will rotate the worm 66 and thereby impart a rotatable movement to the worm wheel 65 and crank shaft 61. The crank shaft 61 will cause the carriage 56 to be slid along the rails 55 and thereby cause the front end of the table 14 to be lifted or lowered according to the direction of movement of the hand wheel 71. Thus the drums 29 and 36 and pins 34 and 35 can be lowered or raised.

The batting drum 36 is supported by a flexible cable 73, the lower end of which is secured to one of the arms 38 and the upper end is wound on a reel 74 which is mounted under the driver's seat 28, as shown in Fig. 1. This reel is secured to a shaft 75 which has a ratchet wheel 76 and a hand lever 77 secured thereto. The ratchet wheel 76 is normally prevented from rotating by a pawl 78. However, by rotating the hand lever 77 in one direction the cable 73 can be wound upon the reel 74 and in so doing the arms 38 and batting drum 36 will be raised. To lower the batting drum 36 it is merely necessary to disengage the pawl 78 from the ratchet wheel 76 and by permitting the hand lever 77 to rotate the arms 38 will swing by gravity and the drum 36 will be consequently lowered.

It will thus be understood that as the apparatus is moved forwardly the wheels 15 and 16 will ride between the rows of plants and the plants, as the vehicle body passes thereover, will be stripped of their fruit, which fruit will be conveyed by the conveyer 45 into the receptacle 54 which can be emptied from time to time.

In the form of my invention as illustrated, in order to prevent shives and portions of the plants from entering between the table 14 and frame 13, I provide a guard 79 which can be made of a sheet of flexible metal secured to the front edge of the table 14 and provided with slots 80 through which bolts 81 loosely extend and these bolts are secured to the front of the frame 13. The slots 80 permit the relative movement between the table 14 and frame 13 (see Figs. 1 and 5).

In order to prevent injury to the driver, I provide a shield 82 in the form of a hood or cover which can be made of sheet metal and is secured to the standards 26 and 27 below the driver's seat. A foot rest 83 is secured to the shield 82 so that a driver can comfortably sit upon the seat 28 and support his feet upon the rest 83.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. Apparatus of the character described including a vehicle body; a table pivotally mounted, adjacent its rear end, on said vehicle body; pins supported on the front end of said table; a rotatable stripping drum supported by said table and coöperative with the pins whereby plants are stripped of their fruit; and means for moving said table on its pivot whereby the raising and lowering of said table is effected to vary the height of said pins and drum without changing the distance therebetween, substantially as described.

2. Apparatus of the character described including a vehicle body; a stripping drum rotatably supported on said vehicle body; pivoted arms having their pivots coincident with the axis of the stripping drum; a batting drum rotatably supported by said arms; and common driving means for rotating both of said drums whereby said arms can be moved into various positions without disturbing the operativeness of the driving means, substantially as described.

3. Apparatus of the character described including a vehicle body; a stripping drum rotatably supported on said vehicle body; pivoted arms having their pivots coincident with the axis of the stripping drum; a batting drum rotatably supported by said arms; sprockets connected respectively to said drums; and a driving chain operatively engaging both of said sprockets, substantially as described.

4. Apparatus of the character described including a vehicle body; standards thereon; a drum rotatably supported between said standards; a plurality of rows of pins on said drum; means on said vehicle body supporting pins with which the pins of said drum mesh; dividing pins on said vehicle body projecting forwardly of said second mentioned pins; arms pivotally supported by said standards; a batting drum journaled in said arms and located in advance of said third mentioned pins; sprockets operatively connected to each of said drums; traction wheels upon which said vehicle body is mounted; a rotatable axle connected to certain of said wheels; a sprocket on said axle; a chain connecting all of said sprockets whereby the drums are rotated due to the movement of the vehicle body on said wheels; a movable table on said vehicle body and forming the direct support for said standards; and means for raising and lowering said table, substantially as described.

5. Apparatus of the character described including a vehicle body; standards thereon; a drum rotatably supported between said standards; a plurality of rows of pins on said drum; means on said vehicle body supporting pins with which the pins of said drum mesh; dividing pins on said vehicle body projecting forwardly of said second mentioned pins; arms pivotally supported by said standards; a batting drum journaled in said arms and located in advance of said third mentioned pins; sprockets operatively connected to each of said drums; traction wheels upon which said vehicle body is mounted; a rotatable axle connected to certain of said wheels; a sprocket on said axle; a chain connecting all of said sprockets whereby the drums are rotated due to the movement of the vehicle body on said wheels; a movable table on said vehicle body and forming the direct support for said standards, said vehicle body including a frame; a crank shaft having portions rotatably mounted in said frame; rails on said table; a carriage slidable on said rails and operatively connected to the crank shaft; and means for operating said crank shaft whereby the table is raised relatively to said frame, substantially as described.

6. Apparatus of the character described including a vehicle body; standards thereon; a drum rotatably supported between said standards; a plurality of rows of pins on said drum; means on said vehicle body supporting pins with which the pins of said drum mesh; dividing pins on said vehicle body projecting forwardly of said second mentioned pins; arms pivotally supported by said standards; a batting drum journaled in said arms and located in advance of said third mentioned pins; spockets operatively connected to each of said drums; traction wheels upon which said vehicle body is mounted; a rotatable axle connected to certain of said wheels; a sprocket on said axle; a chain connecting all of said sprockets whereby the drums are rotated due to the movement of the vehicle body on said wheels; a movable table on said vehicle body and forming the direct support for said standards, said vehicle body including a frame; a crank shaft having portions rotatably mounted in said frame; rails on said table; a carriage slidable on said rails and operatively connected to the crank shaft; a worm wheel on said crank shaft; a worm in mesh with said worm wheel; a rod to which said worm is connected; and means for rotating said rod, substantially as described.

7. Apparatus of the character described including a vehicle body having a frame and a table thereon; wheels supporting said frame and including a rotatable axle; means pivotally supporting said table concentrically with said axle; a rotatable drum having pins thereon and mounted above the table; other pins supported by said table and adapted to mesh with the pins of said drum; an apron conveyer movably supported on said table; a gear wheel operatively connected to said apron conveyer; and a gear wheel secured to said rotatable axle and meshing with said first gear wheel, substantially as described.

In testimony whereof I have signed my name to this specification in the presence of two subscribing witnesses.

WAYNE M. STILES.

Witnesses:
MARY A. INGLAR,
CHAS. E. POTTS.